United States Patent
Apostolopoulos et al.

[11] Patent Number: 5,850,294
[45] Date of Patent: Dec. 15, 1998

[54] METHOD AND APPARATUS FOR POST-PROCESSING IMAGES

[75] Inventors: John G. Apostolopoulos, Country Club Hills, Ill.; Nuggehally Sampath Jayant, Gillette, N.J.

[73] Assignee: Lucent Technologies Inc., Murray Hill, N.J.

[21] Appl. No.: 573,705

[22] Filed: Dec. 18, 1995

[51] Int. Cl.[6] .................................................. H04N 1/415
[52] U.S. Cl. ..................... 358/433; 382/250; 382/251; 382/252
[58] Field of Search ................................... 382/250, 251, 382/252, 248; 348/403, 405, 420; 358/433, 426, 530

[56] References Cited

U.S. PATENT DOCUMENTS

| 5,379,122 | 1/1995 | Eschbach | 358/426 |
| 5,608,652 | 3/1997 | Astle | 364/514 R |

OTHER PUBLICATIONS

H. Reeve and J. Lim, "Reduction of blocking effects in image coding," Optical Engineering, vol. 23, pp. 34–37, Jan./Feb. 1984.

B. Ramamurthi and A. Gersho, "Nonlinear space–variant postprocessing of block coded images," IEEE Transactions on Acoustics, Speech and Signal Processing, vol. ASSP–34, pp. 1258–1268, Oct., 1986.

*Primary Examiner*—Thomas D. Lee
*Assistant Examiner*—Jerome Grant, II
*Attorney, Agent, or Firm*—John M. Harman

[57] ABSTRACT

The invention is an image transmitting method and system including receiving encoded images, decoding those images and post-processing the decoded images. The post-processing reduces visual artifacts, such as blocking artifacts and mosquito noise, through separate detection, mapping and smoothing operations while avoiding many of the complexities associated with existing techniques. In detecting blocking artifacts, the inventive method employs DCT-domain detection rather than edge detection in the pixel domain. Also, the interior of a detected block is updated based on the surrounding blocks without disturbing the surrounding blocks. In reducing mosquito noise, the inventive method smooths the non-edge pixels within blocks containing edge pixels rather than smoothing the edge pixels. Also, distortion-induced false edge pixels are distinguished from true edge pixels and heavily smoothed. The post-processing method and system is generally applicable to Block DCT based compression systems, either intrinsically or extrinsically.

24 Claims, 2 Drawing Sheets

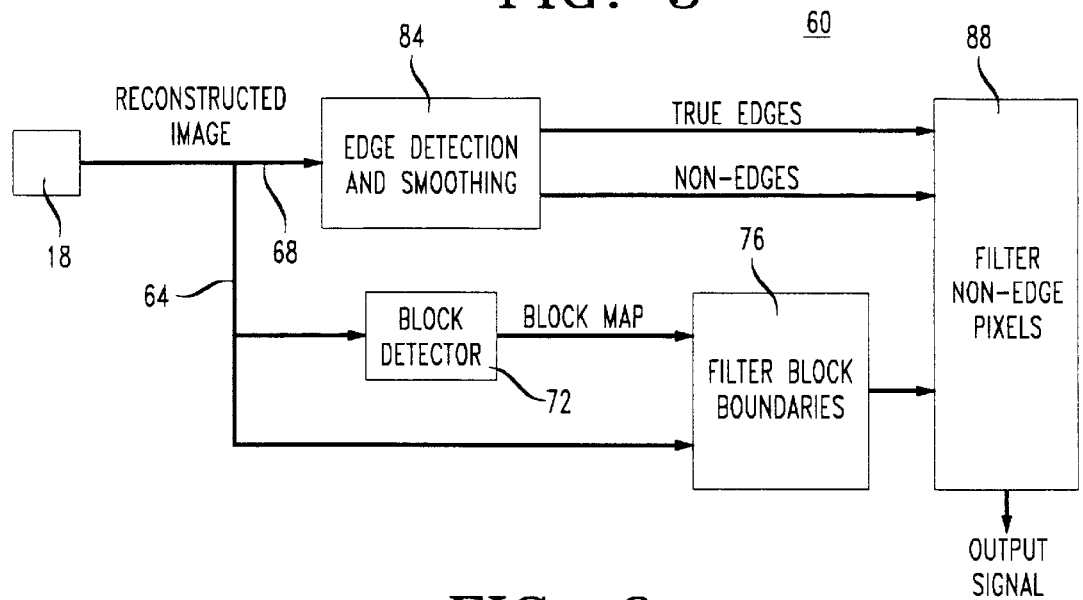
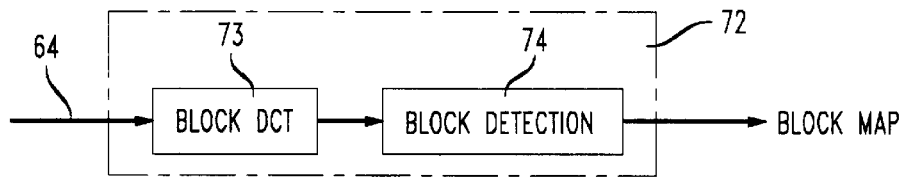
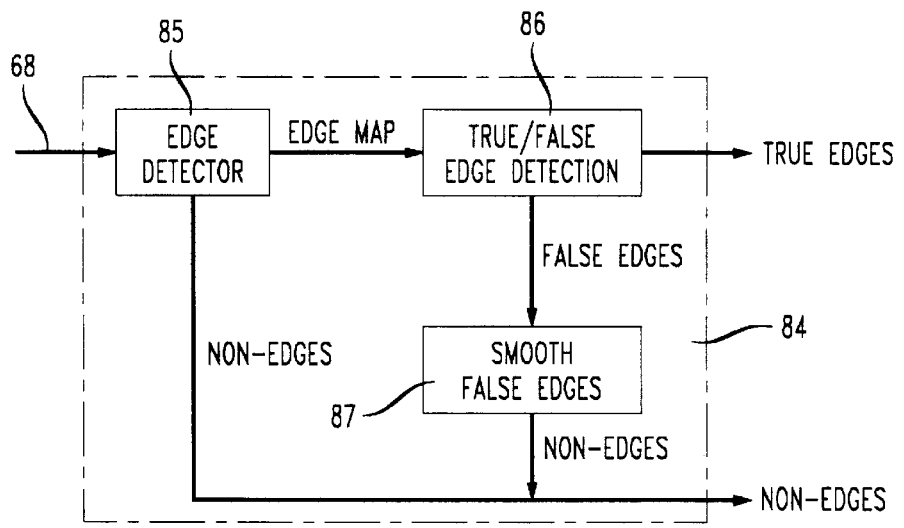

METHOD AND APPARATUS FOR POST-PROCESSING IMAGES

BACKGROUND OF THE INVENTION

1. Field of the Invention

The invention relates to methods and systems for processing electronic image signals. More particularly, the invention relates to methods and systems for reducing distortions caused by compressing and reconstructing electronic image signals.

2. Description of the Related Art

An electronic image signal is comprised of a plurality of picture elements, e.g., pixels. A series of electronic image signals are used to form a video or video sequence. When transmitting electronic image signals, an image compression system is often employed.

A typical image compression system 10 is shown in FIG. 1. In general, such systems receive an input image signal, encode the signal with a coder 14 using, e.g., a compression scheme, transmit the encoded signal through a suitable transmission medium 16, then decode or reconstruct the transmitted information with a decoder 18 into an output image signal.

Despite the extensive development of compression systems in recent times, many image compression systems produce significant distortion when operating at bit rates lower than those designed for or when processing complex material. Therefore, when transmitting compressed information over, e.g., analog telephone lines or personal wireless links (which typically have bit rates on the order of 8–40 kb/s), even today's most sophisticated compression techniques have difficulty in delivering low distortion image signals.

Also, when using existing compression standards, e.g., Joint Photographical Expert Group (JPEG), Motion Picture Expert Group (MPEG), H.261, often, little can be done to conform the compression coding to fit the particular standard in use because most elements in coder 14 and decoder 18 are fixed. However, an external processor 24 can process the input image signal before the information goes through coder 14 (i.e., "pre-processing") so that the available bit rate for the image processing system will be used for perceptually more important information. Similarly, a post-processor 26 can process an image signal reconstructed by decoder 18 ("post-processing") to reduce or remove visual artifacts resulting from waveform distortions in the reconstructed image signal. Thus, by using pre-processing and/or post-processing techniques, the image quality can be improved without altering existing compression schemes.

In newly designed compression systems, the pre- and post-processing operations often are designed as intrinsic elements of the compression system. However, because such is not possible when using existing compression standards, much effort has been directed toward developing pre- and post-processing enhancements for the existing compression systems.

Both compression techniques and decompression or reconstruction techniques are often expressed conceptually as the combination of three distinct yet interrelated operations: representation, quantization, and codeword. An example of the coding portion of these operations is shown generally in FIG. 2 and an example of the decoding or reconstructing portion of these operations is shown generally in FIG. 3.

The first coding operation, representation, expresses the signal more efficiently and in a manner that facilitates the process of compression. An example of representation is Block DCT (shown as 32 in FIG. 2), which is a particular form of discrete cosine transformation (DCT). A signal representation may contain more pieces of information to describe the signal than the signal itself, however, most of the important information is concentrated in only a small fraction of this description, and thus only this small fraction need be transmitted for appropriate signal reconstruction.

The second coding operation, quantization (shown as 34 in FIG. 2), performs amplitude discretization of the representation information. In the third operation, codeword assignment, e.g., variable length coding (VLC), shown as 36 in FIG. 2, the quantized parameters are encoded in a manner to exploit their statistical redundancy and reduce the average bit rate.

The decoding or reconstructing portion of system 10 is shown in FIG. 3 and generally involves the inverse of those operations performed within coder 14, shown in FIG. 2. For example, within decoder 18 are shown the inverse operations of representation 46 (e.g., inverse discrete cosine transform or IDCT), quantization 44 ($Q^{-1}$) and codeword assignment 42 (e.g., variable length decoding or VLD).

The image of interest is often partitioned into nonoverlapping 8×8 blocks, each block is independently transformed (e.g., using 2-D DCT), and the blocks are adaptively processed. The application of DCT in this manner is often referred to as Block DCT.

Partitioning an image into small blocks before applying the DCT affords benefits, including reduced computational and memory requirements, and simplified hardware manufacturing implementation (e.g., via parallel DCT operations) for coder 14 and decoder 18.

In general, a typical video coder is comprised of an image coder plus further process filtering such as temporal filtering and/or spatial filtering. The temporal or time-based filtering is typically performed by a differential pulse code modulation (DPCM)-type or motion-compensation (MC)-type coding scheme. For example, a preceding frame can be used as a reasonable predictor for the current frame, and only the error in the prediction, rather than the entire current frame, needs to be coded and transmitted. Because this error is in the form of a 2-D signal or image, conventional image compression often is applied for its compression (with the differences in characteristics between an error signal and a typical image being accounted for). The temporal processing, in particular how the prediction is formed and what happens when it fails, is important because it affects the spatial processing and the type of artifacts that may occur.

A spatial filter, particularly a spatial post-filter, is dependent on the location of a particular pixel or set of pixels within a single frame of interest. Typically, spatial post-filters are not time dependent and do not rely on information from frames other than the current frame of interest.

Usually, motion-compensated (MC) prediction and related block-based error coding techniques perform well when the image can be modeled locally as translational motion. However, when there is complex motion or new imagery, these error coding schemes may perform poorly, and the error signal may be harder to encode than the original signal. In such cases, it is sometimes better to suppress the error coding scheme and code the original signal itself. It may be determinable on a block-by-block basis whether to use an error coding scheme and code the error signal, or to simply code the original signal. This type of coding is often referred to as inter/intra processing, because the coder switches between inter-frame and intra-frame processing.

Block-based MC-prediction and inter/intra decision making are the basic temporal processing elements for many conventional video compression standards. Generally, these block-based temporal processing schemes perform well over a wide range of image scenes, enable simpler implementations than other approaches, and interface nicely with any Block DCT processing of the error signal.

For complex scenes and/or low bit rates, a number of visual artifacts may appear as a result of the signal distortion from a compression system. The primary visual artifacts affecting current image compression systems are blocking effects and intermittent distortions, often near object boundaries, called mosquito noise. Other artifacts include ripple, contouring and loss of resolution.

Blocking effects are due to discontinuities in the reconstructed signal's characteristics across block boundaries for a block-based coding system, e.g., Block DCT. Blocking effects are produced because adjacent blocks in an image are processed independently and the resulting independent distortion from block to block causes a lack of continuity among neighboring blocks. The lack of continuity may be in the form of abrupt changes in the signal intensity or signal gradient. In addition, block-type contouring, which is a special case of blocking effect, often results in instances when the intensity of an image is slowly changing.

Mosquito noise is typically seen when there is a sharp edge, e.g., an edge within a block separating two uniform but distinct regions. Block DCT applications are not effective at representing a sharp edge. Accordingly, there is considerable distortion at sharp edges: the reconstructed edges are not as sharp as normal and the adjacent regions are not as uniform as they should be. Mosquito noise is especially evident in images containing text or computer graphics.

Many of the image compression standards available today, e.g., H.261, JPEG, MPEG-1, MPEG-2 and high definition television (HDTV), are based on Block DCT coding. Thus, most of the research into post-processing techniques has focused on reducing the artifacts produced by Block DCT coding, in particular, reducing the blocking artifacts.

Because blocking artifacts are caused primarily by the discontinuities that exist along the block edges, many efforts to reduce these artifacts were motivated by the idea of smoothing these boundaries. In H. Reeve and J. Lim, "Reduction of blocking effects in image coding," *Optical Engineering*, vol. 23, pp. 34–37, January/February, 1984, simple lowpass filtering was applied along the block boundaries. Similarly, in B. Ramamurthi and A. Gersho, "Nonlinear space-variant postprocessing of block coded images," *IEEE Transactions on Acoustics, Speech and Signal Processing*, vol. ASSP-34, pp. 1258–1268, October. 1986, lowpass filtering was applied parallel to the image edges to reduce the distortion while preserving the image sharpness.

Conventional post-processing techniques often are split into two basic classes: open-loop approaches and closed-loop approaches. Open-loop approaches are typically simpler, one-pass schemes. They are relatively less complex, yet still achieve adequate performance. Another advantage is that they are not necessarily tied to the details of the particular coder and therefore are more portable because they are often applicable to a large number of coders. For example, coding techniques that simply filter along block boundaries do not require details about the quantization process (only block size information is required). However, open-loop techniques usually do not ensure that the resulting image is relatively close to the original. Thus, the processed signal may differ significantly from the original signal.

Closed-loop approaches, e.g., POCS (projections onto convex sets) based schemes, are typically more computationally complex because they are iterative or multi-pass in nature. Closed-loop approaches are formulated to converge to something closer to the original signal and often are highly coder-specific, as they exploit more attributes of a given coder (e.g., the specific quantization strategy employed). The greater sophistication and in-depth knowledge of the actual compression provides the potential for higher performance than open-loop schemes. Also, closed-loop schemes typically employ some type of feedback aspect, with "checks" in the feedback loop, to ensure that the processed signal does not diverge from the original signal.

In FIG. 4, a conventional, POCS-based artifact reducing scheme 50 is illustrated in operation with the decoding portion 18 of compression system 10. As shown, a smoothness constraint operation 52 is applied (in the spatial domain) to the reconstructed signal emerging from decoder 18. Thereafter, a quantization constraint 54 is applied in the DCT domain (i.e., after DCT conversion 56). These constraints are applied recursively until the processed image converges to an image with the desired properties (or to an image that is closest to having these properties).

However, despite frequent favorable results, schemes such as that shown in FIG. 4 and similar closed-loop techniques are often computationally intensive. Furthermore, configuring an adequate quantization constraint often requires that the post-processing technique be intrinsically tied to the particular compression system it is supporting, thus possibly limiting the range of applicability of the post-processing technique outside of the supported compression system.

It is desirable to have available a compression method, for use alone or in combination with existing compression coders, that transmits natural looking images over analog telephone lines, personal wireless links and other media that employ bit rates lower than existing compression methods are designed for. Specifically, such a compression method should reduce distortion while preserving image sharpness, naturalness and minimizing system complexity.

SUMMARY OF THE INVENTION

According to its major aspects and broadly stated, the invention is a method and system for transmitting images including receiving encoded images, decoding those images and post-processing the decoded images. In particular, it is a method and system in which post-processing reduces visual artifacts, such as blocking artifacts and mosquito noise, through separate detection, mapping and smoothing operations while avoiding many of the complexities associated with existing techniques. In detecting blocking artifacts, the inventive method employs DCT-domain detection rather than edge detection in the pixel domain. Also, the interior of a detected block is updated based on surrounding blocks without disturbing the surrounding blocks. In reducing mosquito noise, the inventive method smooths the non-edge pixels within blocks containing edge pixels without smoothing the edge pixels. Also, distortion-induced false edge pixels are distinguished from true edge pixels and heavily smoothed to ensure that they do not degrade the post-processed image. The post-processing method and system is generally applicable to Block DCT based compression systems, either intrinsically or extrinsically.

BRIEF DESCRIPTION OF THE DRAWINGS

FIG. 5 is a schematic view of a post-processing system according to an embodiment of the invention;

FIG. 6 is a partial schematic view of a block detector used in the post-processing system of FIG. 5; and FIG. 7 is a partial schematic view of a edge detector used in the post-processing system of FIG. 5.

DETAILED DESCRIPTION

Figure 1:
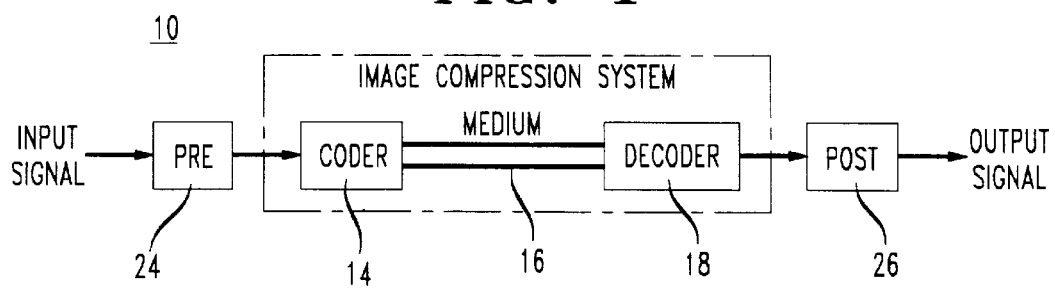
FIG. 1 is a schematic view of a conventional image processing system.

In the following description, similar components are referred to by the same reference numeral in order to simplify the understanding of the drawings.

Figure 2:
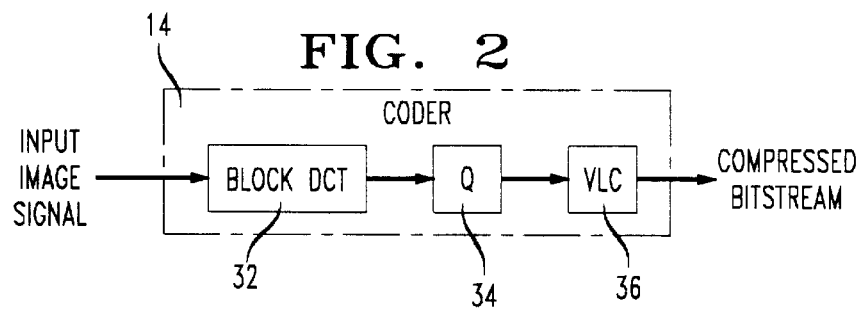
FIG. 2 is a partial schematic view of the compression or coding portion of the image processing system shown in FIG. 1.
Figure 3:
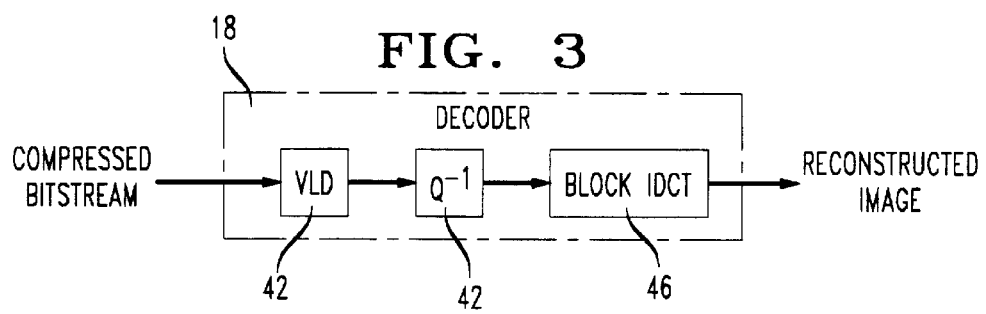
FIG. 3 is a partial schematic view of the decoding or reconstruction portion of the image processing system shown in FIG. 1.
Figure 4:
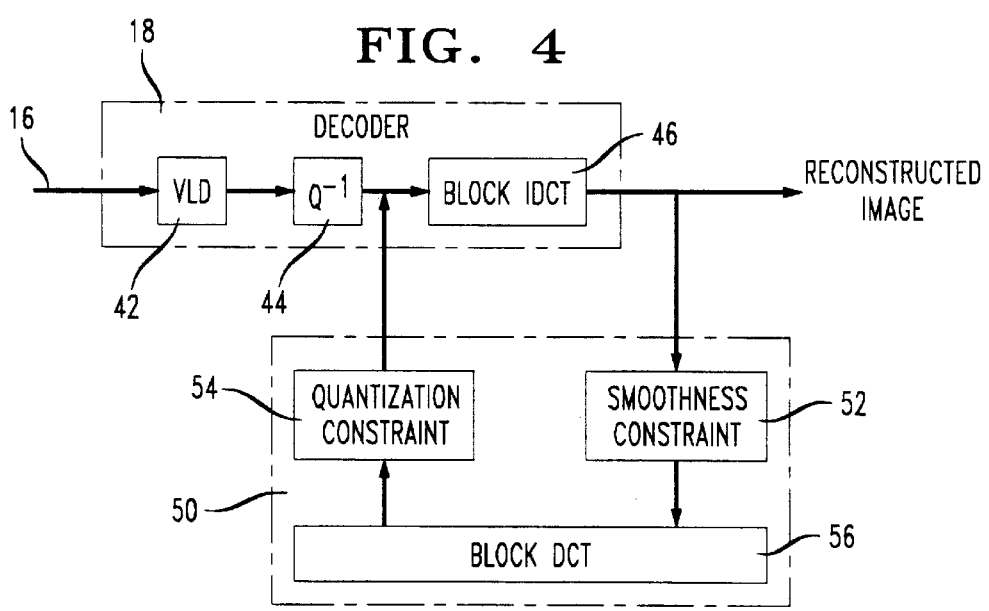
FIG. 4 is a partial schematic view of the decoding portion of the image processing system shown in FIG. 1 in operation with a conventional post-processing system.

In many block-based image compression systems, the representation stage (e.g., Block DCT 32 in FIG. 2) preserves the information of the original signal, and hence is lossless or invertible. Similarly, codeword assignment (e.g. VLC 36 in FIG. 2) is invertible. Thus, distortion is introduced during quantization. It is important to realize that while the distortion is introduced by quantization, the form that the distortion takes is a function of the chosen representation. That is, the type of representation used dictates how the distortion manifests itself in the reconstructed image.

Spatially-adaptive processing is necessary in preserving the important image elements, such as edges, texture and uniform areas, while eliminating blocking effects and mosquito noise. As discussed previously, many approaches exist for detecting and processing the different elements in a signal. Artifact detection and reduction is typically performed in the pixel domain. However, because most artifacts result from quantization in the DCT-domain, in some cases, artifact detection should occur in the DCT domain instead of the pixel domain.

Also, to reduce the detected artifacts, there exists a wide range of linear and nonlinear filtering techniques. However, the choice of filter is not as important as the specific details of its incorporation within the post processing scheme.

Referring to FIG. 5, a post-processing system 60 according to an embodiment of the invention is shown. The system comprises two separate yet coexisting processing paths: a first processing path 64 for reducing blocking effects and a second processing path 68 for reducing mosquito noise. As will be evident from further discussion, the two processing paths are independent of one another and can be performed sequentially or in parallel with one another, and their results are combinable without unacceptably affecting image quality.

In general, the first step in reducing blocking effects (i.e., processing path 64) is detecting or identifying, with a block detector 72, the blocks that may exhibit these artifacts. Once these potential problem blocks are identified, a block map is generated showing their respective locations to guide the subsequent filtering or smoothing technique (shown generally as 76).

Since blocking artifacts result from discontinuities in the signal characteristics across block boundaries and these discontinuities are pixel-domain phenomena, many detection techniques search for discontinuities along the boundary pixels (often similar to edge detection at block boundaries). However, according to an embodiment of the invention, block detection is performed in the DCT domain. Therefore, as shown in FIG. 6, block detector 72 uses a Block DCT operation 73 to transform the signal into the DCT domain prior to any actual block detection operation, shown generally as 74.

Specifically, blocking artifacts result when an inadequate number of DCT coefficients (i.e., the data resulting from the application of a DCT operation) represent a particular block. Typically, this occurs when only approximately one to three coefficients are used. Therefore, according to an embodiment of the invention, blocks that potentially exhibit blocking artifacts are found, e.g., by calculating the number of nonzero DCT coefficients in a coded block and comparing that to a threshold.

The computational requirements for this detection technique are not burdensome. For example, in a still-frame compression scheme (e.g., JPEG), if post-processing in this manner is coupled with decoding or reconstruction, all of the nonzero DCT coefficients are already available as a result of the previous coding and decoding.

In highly compressed video, a significant number of the blocking artifacts occur for intra-coded blocks. For these blocks, the decoder already has the nonzero DCT coefficients. For optimal performance, the DCT coefficients also should be computed for all the inter-coded blocks. However, the computational requirements may be reduced considerably by choosing to examine only those blocks that are likely to exhibit blocking effects, e.g. the blocks having relatively significant motion in the current frame. In this manner, redundant smoothing of many blocks smoothed after their initial intra-coding is reduced.

Once potential problem blocks are detected by detector 72, an appropriate filtering or smoothing operation 76 (see FIG. 5) is applied to reduce the blocking effects. It is important to successfully reduce the blocking effects without distorting the image. For example, when processing images with high spatial resolution, heavy filtering along the block boundaries produces minimal added distortion to the image. In contrast, when processing low-resolution images, which are characteristics of very-low bit rate compression systems, excessive filtering often has drastic harmful effects on the resulting image quality.

The invention described herein adopts the notion that the pixels within a potential problem block are more distorted than the pixels in the surrounding blocks, i.e., the pixels outside the block in question are more accurate than the pixels inside the block in question. Therefore, the accurate exterior pixels are used to improve the estimate of the distorted interior pixels without altering the exterior pixels.

Such approach is equivalent, essentially, to applying a filter along the boundaries of a detected block but only updating the pixels values within the block. For example, horizontal lowpass filtering is applied to reduce the discontinuity along the left and right boundaries of the distorted block, but only the pixels within the block are actually updated. The pixels in the surrounding blocks are left untouched. Similarly, for example, a vertical lowpass filter is applied along the top and bottom edges of the distorted block to reduce the discontinuity along these edges. Note that if two adjacent blocks are identified as exhibiting blocking artifacts, the resulting processing according to this embodiment of the invention is equivalent to conventional lowpass filtering along the boundary.

The second processing path 68 involves reducing mosquito noise. In general, pixels that potentially may exhibit mosquito noise are detected initially and then smoothed. More specifically, because mosquito noise appears as random noise or oscillatory distortion within an 8×8 pixel block and is especially prominent in blocks containing sharp edges, blocks containing sharp edges are detected using an edge detecting operation 84 and then the non-edge pixels within the identified blocks are smoothed using an appropriate filtering or smoothing operation 88 (see FIG. 5).

This approach relies on the notion that non-edge pixels potentially exhibit mosquito noise. It is important to note that only the non-edge pixels are smoothed in order to retain image sharpness, which implies that preserving the fidelity of the edges is of high priority. The edge pixels exhibit distortion similarly to any pixel in the afflicted block. However, filtering the edge pixels produces an unacceptable amount of blurring and therefore an overall loss of image sharpness. Furthermore, typically, the edge distortion is totally masked by the edge itself. Therefore, the edge pixels must be identified carefully and preserved, and then the remaining non-edge pixels are safely smoothed to reduce the mosquito noise. The non-edge pixels are smoothed, e.g., by any of a number of conventional, smoothing techniques.

In general, one problem with edge detection is that large amplitude distortions, such as mosquito noise, may be falsely detected as edges. As a result, these large amplitude distortions evade the smoothing process and degrade the post-processed image. To counteract this problem, it is necessary to distinguish between true edges and false edges and to heavily smooth the false edges.

Therefore, as shown in FIG. 7, edge detection operation 84 uses an edge detector 85 to identify all edges. The identified edges are used to construct an edge map that undergoes a further operation (shown generally as 86) to distinguish the true edges from the false, distortion-induced edges.

One manner of distinguishing true edges and false edges from the edge map is by examining the connectivity of the pixel in question. For example, four 5-point windows are applied to the edge map, each window being centered at the pixel in question and aligned along the horizontal, vertical and diagonal directions, respectively. If the sum of the edge map values along any of the directions is determined to be greater than or equal to a threshold value, an edge is determined to exist along that direction and the pixel in question is assumed to correspond to a true edge. Otherwise, the pixel in question is assumed to be a false edge.

The notion behind this true/false edge detection approach is that a true edge typically will have a string of adjacent edge pixels. Conversely, a distortion-induced false edge is typically characterized by isolated edge pixels (i.e., edge pixels that are not part of a connected string of edge pixels).

Upon conclusion of such determination, the resulting edge map is now a more accurate indicator of the true edges in the image. The false edges are then smoothed heavily, e.g., by an appropriate smoothing scheme 87.

The detected true edge pixels (i.e., the edge pixels that are not identified as false edge pixels) are passed through the system unprocessed in order to retain image sharpness, as discussed previously. The non-edge pixels undergo smoothing via filtering step 88 (see FIG. 5) to reduce the distortion. As mentioned previously, a number of conventional smoothing techniques are suitable. However, several conventional factors associated therewith need to be considered in choosing a suitable smoothing technique, e.g., whether the smoothing technique should be linear or nonlinear, and how "heavy" the smoothing should be. Such considerations can be determined readily by those skilled in the art, and need not be discussed here.

Alternatively, in filtering step 88, it may be beneficial in terms of retaining image sharpness to not only pass each edge pixel unprocessed in smoothing, but also to pass the top, bottom, left, and right adjacent pixels unprocessed. Therefore, each edge pixel as well as its four adjacent pixels is unprocessed. All the remaining pixels will be smoothed, and all the edge pixels will be excluded from the region of support of the smoothing filter.

Finally, because the pixels in the image are smoothed in a sequential manner, there exists the option of using some of the already smoothed (updated) pixels when smoothing the current pixel. That is, within the window for the smoothing filter, some of the already smoothed pixels may be used with the other non-smoothed pixels. Such a smoothing scheme allows in-place processing to be performed.

The artifact reducing techniques described herein are applicable for use with many image processing systems, including most if not all systems that employ block-based DCT coding schemes. Such coding schemes include JPEG, $P_x$JPEG, MPEG-1, MPEG-2, MPEG-4, H.261, H.263, HDTV (High Definition Television) and Dig. NTSC (National Television System Committee). However, it is not required that the inventive features described herein be used with block-based coding schemes. For example, the edge filtering used in reducing mosquito noise is not dependent on Block DCT operations being part of the overall coding scheme.

It will be apparent to those skilled in the art that many changes and substitutions can be made to the post-processing method and system herein described without departing from the spirit and scope of the invention as defined by the appended claims.

What is claimed is:

1. A method for transmitting images including the receipt of an encoded image, the decoding of said image and the post-processing of said decoded image, said image signals comprised of blocks including blocks having blocking effect artifacts and blocks having mosquito noise artifacts, said blocks comprised of pixels including edge pixels and non-edge pixels, said edge pixels including true edge pixels and false edge pixels, said post-processing comprising the steps of:

transforming said plurality of blocks into the DCT domain;

detecting blocks having said blocking effect artifacts;

generating a block map including detected blocks having said blocking effect artifacts and blocks not having said blocking effect artifacts;

smoothing said detected blocks based on said generated block map whereby said blocking effect artifacts are substantially reduced;

identifying said edge pixels, said identifying step including distinguishing between said true edge pixels and said false edge pixels, generating an edge map based on said distinguishing step, and smoothing said false edge pixels based on said generated edge map; and filtering the pixels not identified as edge pixels in said identifying step.

2. The method as recited in claim 1, wherein said detecting step further comprises the steps of:

calculating the number of nonzero DCT coefficients associated with each of said plurality of blocks; and comparing said calculated number with a threshold value.

3. The method as recited in claim 1, wherein said blocks include blocks having mosquito noise artifacts, and wherein said post-processing further comprises the step of reducing the number of mosquito noise artifacts from said blocks.

4. The method as recited in claim 1, wherein said blocks include blocks having mosquito noise artifacts, wherein said blocks are comprised of pixels including sharp edge pixels and non-edge pixels, and wherein said post-processing further comprises the steps of:

identifying blocks having sharp edge pixels; and filtering the non-edge pixels within those blocks identified as having sharp edge pixels.

5. The method as recited in claim 1, further comprising, prior to said transforming step, the steps of:

compressing a plurality of image signals;

transmitting said compressed image signals over a transmission medium; and decompressing said compressed image signals thereby reconstructing said plurality of image signals.

6. The method as recited in claim 1, wherein said block smoothing step further comprises the steps of:

smoothing the edges of each of said detected blocks based on the edges of blocks adjacent thereto in said block map; and updating the pixel values within said detected block without substantially modifying the pixel values within said adjacent blocks.

7. The method as recited in claim 6, wherein said edge smoothing step includes filtering the boundaries between said detected blocks and blocks adjacent thereto in said block map.

8. The method as recited in claim 6, wherein said edge smoothing step further comprises horizontal lowpass filtering along the left and right edges of said detected blocks and vertical lowpass filtering along the top and bottom edges of said detected blocks.

9. A method for transmitting images including the receipt of an encoded image, the decoding of said image and the post-processing of said decoded image, said image signals comprised of blocks including blocks having mosquito noise artifacts, said blocks comprised of pixels including edge pixels and non-edge pixels, said edge pixels containing true edge pixels and false edge pixels, said post-processing comprising the steps of:

identifying said edge pixels;

distinguishing said edge pixels between said true edge pixels and said false edge pixels, said distinguishing step including comparing said pixels with at least one adjacent pixel whereby a degree of connectivity is established and determining said true edge pixels based on said degree of connectivity of said pixels;

generating a map based on said distinguishing step;

smoothing said false edge pixels based on said generated edge map; and filtering the pixels not identified as edge pixels.

10. The method as recited in claim 9, wherein said blocks include blocks having blocking effect artifacts and wherein said post-processing further comprises the step of reducing the number of blocking effect artifacts from said blocks.

11. The method as recited in claim 9, wherein said blocks further include sharp edge pixels, and wherein said post-processing further comprises the steps of:

identifying blocks having said sharp edge pixels; and smoothing the non-edge pixels within those blocks identified as having sharp edge pixels.

12. The method as recited in claim 9, further comprising, prior to said identifying step, the steps of:

compressing a plurality of image signals;

transmitting said compressed image signals over a transmission medium; and decompressing said compressed image signals thereby reconstructing said plurality of image signals.

13. The method as recited in claim 9, wherein said filtering step includes filtering said non-edge pixels based on one or more of the pixels that are not edge pixels and that are not beyond any edge defined by the edge pixels associated therewith.

14. The method as recited in claim 9, wherein said blocks include blocks having blocking effect artifacts and wherein said post-processing further comprises the steps of:

detecting said blocks having blocking effect artifacts;

generating a block map of blocks including said detected blocks and said blocks not detected; and filtering the boundaries of said detected blocks based on said generated block map.

15. The method as recited in claim 14, wherein said detecting step further comprises the steps of:

transforming said plurality of blocks into the DCT domain;

calculating the number of nonzero DCT coefficients associated with each of said blocks; and comparing said calculated number with a threshold value.

16. The method as recited in claim 14, wherein said boundary smoothing step further comprises the steps of:

smoothing the edges of each of said detected blocks based on the edge of blocks adjacent thereto in said block map; and updating the pixel values within said detected block without substantially modifying the pixel values within said adjacent blocks.

17. The method as recited in claim 16, wherein said edge smoothing step includes filtering the boundaries between said detected blocks and blocks adjacent thereto in said block map.

18. The method as recited in claim 16, wherein said edge smoothing step further comprises horizontal lowpass filtering along the left and right edges of detected blocks and vertical lowpass filtering along the top and bottom edges of detected blocks.

19. A method for transmitting images including the receipt of an encoded image, the decoding of said image and the post-processing of said decoded image, said image signals comprised of blocks including blocks having mosquito noise artifacts, said blocks comprised of pixels including true edge pixels and false edge pixels, said edge pixels containing true edge pixels and false edge pixels, said post-processing comprising the steps of:

distinguishing said edge pixels between said true edge pixels and said false edge pixels, said distinguishing step including comparing said edge pixels with at least one adjacent pixel whereby a degree of connectivity is established and determining said true edge pixels based on said degree of connectivity of said edge pixels;

generating a map based on said distinguishing step;

smoothing said false edge pixels based on said generated edge map; and filtering said image signals based on said detected true edge pixels.

20. A system for transmitting images including the receipt of an encoded image, the decoding of said image and the post-processing of said decoded image, said image signals comprised of blocks including blocks having blocking effect artifacts and blocks having mosquito noise artifacts, said blocks comprised of pixels including edge pixels and non-edge pixels wherein said edge pixels include true edge pixels and false edge pixels, said system comprising:

a first post-processing coder for reducing said blocking effect artifacts from said blocks, said first post-processing including a DCT domain detector for detecting blocks having said blocking effect artifacts and for generating a block map including detected blocks having said blocking effect artifacts and blocks not having said blocking effect artifacts, and a filter for smoothing the edges of said detected blocks based on the blocks adjacent thereto according to said generated block map; and a second post-processing coder for reducing said mosquito noise artifacts from said blocks, said second post-processing coder including a detector for identifying said edge pixels and a filter for smoothing the pixels not identified as said edge pixels by said edge pixel detector, said edge pixel detector being capable of distinguishing between said true edge pixels and said false edge pixels and including a filter for smoothing said false edges whereby said false edges are smoothed into non-edge pixels.

21. The system as recited in claim 20, wherein said filter further comprises:

a horizontal lowpass filter for filtering along the left and right edges of said detected blocks; and a vertical lowpass filter for filtering along the top and bottom edges of said detected blocks.

22. The system as recited in claim 19, wherein said blocks are comprised of pixels including edge pixels, sharp edge pixels and non-edge pixels, and wherein said second post-processing coder further comprises:

a detector for detecting said blocks having said sharp edge pixels; and a filter for smoothing the non-edge pixels within those blocks identified as having sharp edge pixels.

23. The system as recited in claim 19, wherein said first and second post-processing coders each have an input and wherein said system further comprises an image processing system having an output operably connected to said inputs of said first and second post-processing coders.

24. The system as recited in claim 19, wherein said first and second post-processing coders each have an input and wherein said system further comprises a block-based image processing system having an output operably connected to said inputs of said first and second post-processing coders, whereby said block-based image processing is selected from the group consisting of JPEG, $P_X$JPEG, MPEG-1, MPEG-2, MPEG-4, H.261, H.263, HDTV and Dig. NTSC.

* * * * *